United States Patent
Gray

(10) Patent No.: US 8,561,647 B2
(45) Date of Patent: Oct. 22, 2013

(54) SAFETY AND INDICATOR APPARATUS SYSTEMS AND METHODS FOR HIGH PRESSURE CONDUITS

(75) Inventor: Yelena Gray, Parker, CO (US)

(73) Assignee: The Gates Corporation, Denver, CO (US)

( * ) Notice: Subject to any disclaimer, the term of this patent is extended or adjusted under 35 U.S.C. 154(b) by 978 days.

(21) Appl. No.: 12/290,172

(22) Filed: Oct. 28, 2008

(65) Prior Publication Data

US 2009/0223584 A1 Sep. 10, 2009

Related U.S. Application Data

(60) Provisional application No. 61/068,538, filed on Mar. 7, 2008.

(51) Int. Cl.
*F16L 55/00* (2006.01)
*F16L 9/18* (2006.01)
*F16L 55/18* (2006.01)

(52) U.S. Cl.
USPC .............. 138/104; 138/108; 138/112; 138/97

(58) Field of Classification Search
USPC .................................. 138/104, 108, 112, 97
See application file for complete search history.

(56) References Cited

U.S. PATENT DOCUMENTS 3,831,635 A * 8/1974 Burton ........................... 138/114
4,345,624 A * 8/1982 Rider ............................ 138/110
4,944,258 A 7/1990 Knutson et al. ............... 134/167
5,099,894 A 3/1992 Mozeley, Jr. ..................... 141/86
5,857,711 A 1/1999 Comin-DuMong et al. ..... 285/38
5,996,637 A 12/1999 Larsson ........................ 138/110

(Continued)

FOREIGN PATENT DOCUMENTS

| JP | S56-039687 U | 4/1981 | |
| JP | S58-196497 U | 12/1983 | |
| WO | WO 01/42703 A1 | 6/2001 | ............. F16L 35/00 |

OTHER PUBLICATIONS

Notification of Transmittal of the International Search Report and the Written Opinion of the International Searching Authority, or the Declaration for PCT/US2009/001393 Mailed Jul. 1, 2009.

(Continued)

*Primary Examiner* — Justin Jonaitis
(74) *Attorney, Agent, or Firm* — Paul N. Dunlap, Esq.; Jeffrey A. Thurnau, Esq.

(57) ABSTRACT

A pressure-relieving safety assembly, comprising a sleeve and collar, protects against human injury and loss of life by blocking flow of fluid from a ruptured high pressure conduit and provides pressure relief for escaping fluid. This pressure-relieving assembly includes a sleeve that encircles the high-pressure line and is secured to, at one or both ends of the line, a coupling. The sleeve is secured to the coupling(s) by a collar having raised portions that provides a path for fluid that has escaped from the conduit at a burst or pin-hole failure location, to flow towards the ends of the conduit, indicating to the user that a conduit failure has occurred. The sleeve lowers the fluid velocity while the path provided by the collar prevents the fluid pressure from building up behind the sleeve.

25 Claims, 1 Drawing Sheet

(56) References Cited

U.S. PATENT DOCUMENTS

| | | | |
|---|---|---|---|
| 6,039,066 A * | 3/2000 | Selby | 137/312 |
| 6,085,796 A | 7/2000 | Riga | 138/114 |
| 6,296,283 B1 | 10/2001 | Dietzel | 285/256 |
| 6,446,661 B2 * | 9/2002 | Armenia et al. | 137/312 |
| 6,817,082 B2 | 11/2004 | Grepaly et al. | 29/516 |
| 6,837,524 B2 | 1/2005 | Nishimura et al. | 285/256 |
| 6,983,767 B2 * | 1/2006 | Rickards | 138/110 |
| 7,077,149 B2 * | 7/2006 | Kalley et al. | 137/1 |
| 7,168,451 B1 | 1/2007 | Dundas | 138/110 |
| 2002/0017330 A1 | 2/2002 | Armenia et al. | 138/109 |

OTHER PUBLICATIONS

ISO International Organization for Standarization, ISO/DIS 3457.2, "Earth-moving Machinery—Guards—Definitions and Requirements", Revision of Third Edition (ISO 3457:1986), 21 pages.

ISO International Organization for Standarization, ISO 6945-1983 (E), "Rubber Hoses—Determination of Abrasion Resistance of the Outer Cover", First Edition—Oct. 15, 1983, 5 pages.

ISO International Organization for Standarization, Ref. ISO 3457-1979 (E), "Earth-moving Machinery—Guards and Shields—Definitions and Specifications", Second Edition—Jan. 9, 1979, 3 pages.

BSI British Standards Institution, EN 474-1: 1994, 24 pages.

* cited by examiner

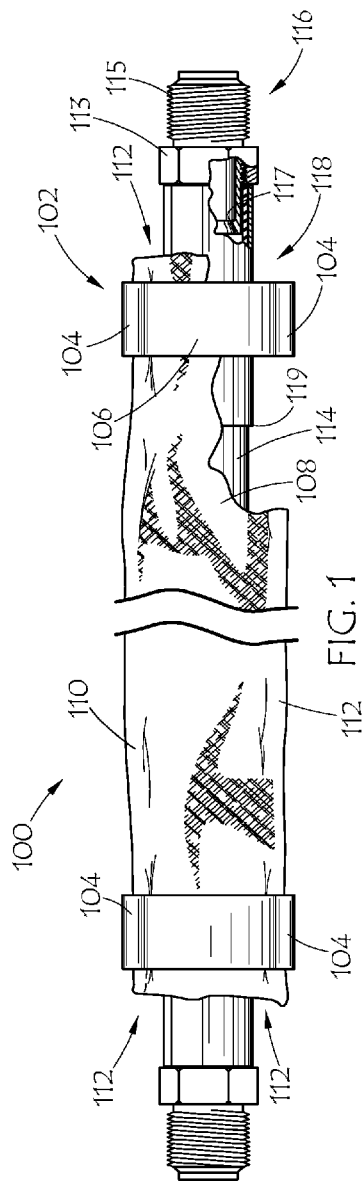
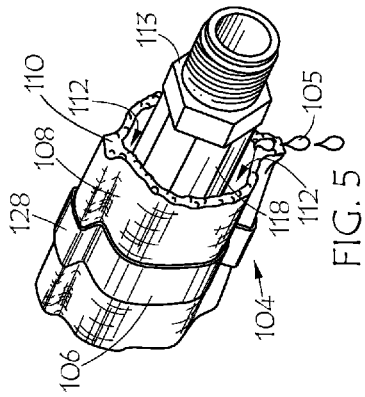
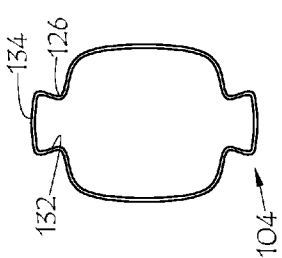
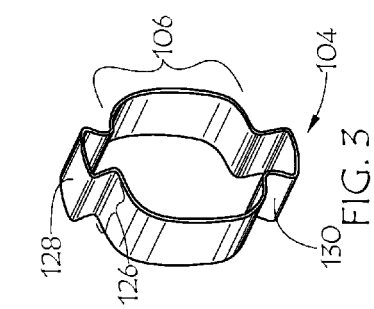
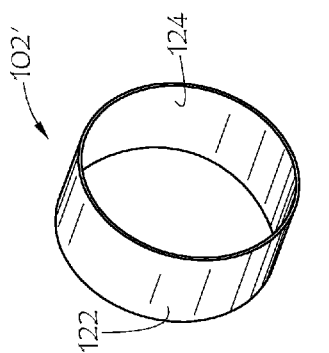

SAFETY AND INDICATOR APPARATUS SYSTEMS AND METHODS FOR HIGH PRESSURE CONDUITS

CROSS-REFERENCE TO RELATED APPLICATION

This application claims the benefit of U.S. Provisional Application No. 61/068,538, of the same title, filed Mar. 7, 2008, which is incorporated herein by reference.

BACKGROUND OF THE INVENTION

1. Field of the Invention

This invention relates generally to pressurized conduits such as hoses and tubes, more particularly to systems and methods for protecting against human injury and loss of life due to catastrophic failures in the form of bursts or pin-hole failures in such high pressure fluid conduits, and specifically to a sleeve and collar safety assembly that encloses the length of a high pressure conduit.

2. Description of the Prior Art

As is well known within the hydraulics industry, injury resulting from hose bursts and pin-hole leaks can occur in a matter of milliseconds. Hydraulic systems may operate at very high pressures and a leak of pressurized fluid can penetrate the skin, causing severe tissue damage and burns.

Hydraulic hoses, especially those found on construction equipment, tractors and other equipment, are exposed and therefore vulnerable to wear, which can result in leakage and failure. While a protective encasement, or sleeve, can help reduce wear of a hydraulic hose due to abrasion, a sleeve on its own does not prevent high pressure streams from bursting through the sleeve itself. In the past, problems that have affected the design of such systems have included hose pin hole streams or bursts as well as whipping, where an unmitigated flow of fluid from the end of a hose causes uncontrolled movement of the hose and hose end, posing great danger to an operator. Under high operating pressures or heavy weight, the hose and/or fitting can come loose or blow off the hose, causing the end of the hose to whip with great force.

In those situations where wear is unavoidable, rigid spiral hose protectors, spiral plastic sleeves and cloth hose sleeves are sometimes used to help prevent wear. Prior nylon protective sleeves comprising mesh tubing can be slid over single hoses or bundles of hoses and held in place with plastic cable ties or other similar fasteners. These sleeves somewhat help to protect hose from wear and may prolong the life of the hose.

Protection methods for high pressure fluid conduits such as hydraulic pipe, tube, and hose, are known. Such protection typically includes a tubular encasement that is overlaid on the outer surface of the conduit, extends substantially over the full length of the conduit, and may be attached to one or both distal ends of the conduit. Other hose protection systems involve outer metal armoring with a bonded coupling. These currently available high pressure conduit protection methods and systems do not protect against pressure build up of the escaped fluid behind the encasements. The resulting damage to the encasement and/or subsequent release of a high pressure stream and or mist of dangerous fluid renders the encasement virtually useless for protection to operators or bystanders. Further, some prior available high pressure conduit safety assemblies employ removable fasteners for an encasement surrounding a hydraulic conduit. This is a dangerous situation because should the sleeve become detached from the conduit, the operator would be directly exposed to conduit failure. Also, these methods of hose protections are bulky and highly reduce the flexibility of the hose assembly. In the case of metal enclosures, their bulk and inflexibly render their use impractical in certain applications requiring flexible connection.

One example of a flexible protection assembly for high pressure hoses can be found in U.S. Pat. No. 4,345,624 to Rider. Rider attempts to provide protection to equipment operators (and persons standing nearby) by providing a blow-out guard that comprises a double layer of material and wire sheath fixedly attached over an end portion of the hose. The goal of this system in anticipation of a hose burst is to allow the fluid to escape through interstices of the wire sheath, with the intent of reducing the fluid stream to a fine spray. However, inhalation of certain fluids in the form of a spray or mist may be detrimental to one's health. Further, when the material carried by the hose is at a very high temperature or when the wire sheath suffers wear and/or fails to carry out its intended duty, danger arises without warning.

SUMMARY

The present invention is directed to systems and methods, which provide operator protection, and preferably a warning, after a high pressure conduit has incurred damage in the form of a burst, pin-hole failure, or other damage. An example of a safety and warning system that provides superior protection of persons operating equipment employing high pressure conduit systems can be seen in embodiments of the present invention.

ISO 3457, EN474-1, and similar so called "line of sight" protection standards or guidelines state that for hoses carrying material (a fluid) at a pressure of 725 pounds per square inch (psi) or higher, wherein the hose assembly is located within one meter of an operator, or if the material carried within the hose exceeds 50 degrees Celsius, protection is required. Currently available flexible textile systems that attempt to provide such protection fail to meet these requirements, resulting in the potential for serious injury to operators, or even loss of life when unrestricted high pressure material bursts through any existing protective flexible textile encasement.

It would be beneficial to contain any and all material from a hose burst or pin-hole failure so that a person standing nearby would be entirely protected from danger. A hose can unpredictably burst or develop a pin-hole at any location along its length, making protection very challenging. Therefore, it would be beneficial to provide a safety assembly for a hydraulic conduit in which the securement of the encompassing sleeve or encasement is reliable and fixed. However, it would not only be of benefit to shield the hose assembly, but also to reduce pressure build up behind a protective outer hose sleeve to avoid accumulation of material and eventual failure of the sleeve.

Whereas there is no provision in the currently available hose protection systems for relieving pressure of fluid that has escaped from a hydraulic hose and builds up behind an encasement surrounding the hose, no protection exists against the imminent burst of the encasement itself and the ensuing high pressure and/or high temperature stream of fluid. The present pressure relief assembly provides pressure relief for escaped fluid from a high pressure conduit such that the escaped fluid hits a sleeve that surrounds the conduit, slows in velocity, and drains toward one or both ends of the conduit, via a channel, preferably provided by a collar. The escaping fluid does not have opportunity to accumulate behind the sleeve, build in pressure, burst through the protective sleeve and pose danger to the operator standing next to the conduit.

Rather, the fluid from a pin-hole, or contained burst, drains out of the sleeve at the end portion(s) of the conduit, which in turn alerts the operator to the failure of the conduit.

The process of compressing the collar around the sleeve to secure the sleeve fixedly to one or, preferably both, distal ends of the conduit results in at least one raised portion depending on the method used for compression or the tool itself. The raised portion(s) provide(s) the fluid with an escape route. Preferably, the collar is compressed sufficiently to provide secure attachment of the hose to the sleeve, yet has enough structure to provide a channel from which fluid can escape.

Any type of compression method can be used to secure the collar to the sleeve. For example, if using a crimping tool, dies having a tapered generally trapezoidal shape in cross-section, may be retracted to produce the raised portion(s). Upon compression of the collar, the "flowing" metal, which follows the shape of the dies' contact surfaces, forms raised portions. Therefore the shape, size, or cross-section of the raised portion is easily variable depending upon the desired use of the present invention. Additional collars could be used, or collars could be attached to one another or "stacked" in an adjacent fashion along certain portions of the length of the hydraulic conduit for additional stability and/or security.

An important advantage of the various embodiments of the present invention is that the sleeve is held in place securely, yet just enough of a channel is provided by the raised portion(s) of the ferrule through which fluid from a hose failure can flow. The various embodiments of the present invention are low-cost, simple to manufacture and implement at time of manufacture or as a retrofit, and are lightweight, elegant, and effective.

Thus, in accordance with embodiments of the present invention a method of slidably disposing an impervious sleeve over a fluid conduit having a collar disposed on each end secured thereto might include at least partially radially compressing the collar to engage a coupling associated with each end of the fluid conduit so that the sleeve is held securely to the conduit and comprises a channel through which fluid that escapes from damaged portions of the conduit can flow safely to the end portions of the conduit. Other methods of attaching the sleeve can be employed in accordance with the present invention, for example various types of clamps, which may be fashioned to form channel ends.

It would therefore be of benefit to provide a system that would decrease the velocity and pressure of the escaping fluid and provide a safe channel through which the escaped fluid could flow. It would also be highly desirable to provide a system that would alert the operator to dangerous fluid escape from the conduit.

Thus, a hose system in accordance with the present invention might comprise a high pressure hose, with an impervious sleeve disposed over the hose. This preferably defines an interstitial space between the sleeve and the hose. Also, the impervious sleeve is preferably impervious to streams of high pressure fluid resulting from a pinhole puncture of the hose, and/or capable of containing bursting of the hose, at a pressure above a rated pressure of the hose. Typically, a coupling, or the like is disposed in each end of the hose and in accordance with the present invention a collar is disposed on each end of the sleeve. The collar is preferably compressed to secure the end of the sleeve between the collar and a ferrule that secures the coupling in the end of the hose. This compression also preferably defines ends of a fluid channel, defined by the interstitial space. As discussed above, this fluid channel preferably provides a path for fluid in the interstitial space to flow out of the interstitial space and to thereby also provide an indication of a failure of the hose.

Another advantage afforded by embodiments of the present invention is that when failure in a hose is close to the end of the sleeve, the force behind the fluid tends to pull yarn out of the woven matrix of the sleeve material. Thus, sleeve fabric unsupported by the collar tends to fail at the edge. In accordance with embodiments of the present invention, the end of the fabric making up the hose sleeve is supported and such "pull-out" is avoided.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 1 is a partially fragmented environmental view of an embodiment of the present safety and indicator apparatus and system;

FIG. 2 is a perspective view of a collar of the present invention, before attachment to a sleeve of the present invention and coupling;

FIG. 3 is a standalone perspective view of an embodiment of the collar of FIG. 2 after the collar has been compressed;

FIG. 4 is front view of an embodiment of the collar shown in FIGS. 2 and 3; and, FIG. 5 is a perspective view of an end portion of the pressure relief assembly of FIG. 1 showing the channel through which pressure-relieved fluid may flow.

DETAILED DESCRIPTION

Referring to FIGS. 1 and 5, embodiment 100 of the present safety and indicator apparatus and system is shown. In various embodiments of the present invention, the high pressure conduit may comprise hydraulic fluid conduits, such as hydraulic hose, line or pipe. However, it should be understood that the present assemblies can be used in conjunction with conduits or bundles of conduits of virtually any type or size including conduits in the farming, heavy duty equipment, aerospace, power, medical, oil, automotive, and other industries. In other various embodiments of the present invention, high pressure fluid in the form of a liquid may be carried by high pressure conduits employing the present invention. However, it should be understood that the present assemblies can be applied to conduits carrying any type of material, including high pressure hydraulic fluids such as synthetic compounds, mineral oil, water and water-based mixtures, or any other material.

Referring back to FIG. 1, illustrated embodiment of pressure relief assembly 100, employs an embodiment of the present invention that includes impervious sleeve 108 encircling high pressure conduit 114, which is attached securely by collar 104 to the conduit, over ferrule 118 of coupling 116. In the illustrated use of the present invention, pressure relief assembly 100 is disposed on conduit 114. As noted, pressure relief assembly 100 may comprise a sleeve 108 and collar 102. Sleeve 108 may comprise a full-length, but preferably otherwise slightly oversized, sleeve, which encircles the entire circumference of conduit 114, providing an interstitial space between the conduit 114 and the inner surface of sleeve 108. Sleeve 108 extends along the entire length of conduit 114, so that a burst, pin-hole failure, or other form of damage to conduit 114 is surrounded by impervious sleeve 108. Sleeve 108 may be "impervious" in that it may comprise any material with the ability to slow the velocity of a high velocity and/or high-temperature stream or burst of escaping material from a location of damage along the length of conduit 114. Preferably, this material is impermeable to a point that it only allows contained fluid to seep through the sleeve, with little, or no, discernible energy. As such, sleeve 108 may comprise a woven textile fabric having metal interwound therewithin, a non-textile fabric, a primarily metal-infused fabric, or any other type of fabric. However, preferably, the material comprising sleeve 108 is an impervious material which will stop the stream of fluid produced by a pin-hole puncture or other breach in conduit 114 at an elevated pressure, such as at twice the rated pressure of a hose. Such a sleeve material is disclosed in U.S. patent application Ser. No. 12/040,596, entitled "Line of Sight Hose Cover," filed on Feb. 29, 2008, the disclosure of which is incorporated herein by reference. As such, the sleeve preferably absorbs the energy of a pinhole hose failure or fluid escaping from a hose burst. The sleeve 108 may provide enough interstitial space to form a channel 112. Sleeve 108 could provide any amount of interstitial space, so long as enough excess sleeve material exists to form a channel 112. Channel 112 may comprise any size of opening capable of delivering fluid that has escaped from a burst or otherwise damaged conduit along the length of the conduit towards the conduit's distal end(s). FIG. 5 shows a lowered velocity stream or trickle of fluid 105 exiting the sleeve 108 through channel 112. As discussed in greater detail below, this trickle of fluid acts as a warning to an operator that the subject conduit has experienced a failure.

Sleeve 108 is affixed to the conduit 114 by a collar 102. Collar 102 may comprise a ferrule-like band such as shown in FIG. 2, which may be swaged or crimped to snugly and concentrically encircle the sleeve 108 and attach it to the conduit 114, such as illustrated in FIGS. 1 and 3-5. The collar 102 may be disposed at any point along a ferrule 118. In typical hydraulic conduit construction, a coupling, such as illustrated as coupling 116 may have threaded portion 115, wrenching flat portion 113. The other end of coupling 116 would typically include stem 117, insertable into the end of conduit 114. Threaded portion 115 allows other components to be attached to the conduit 114 to close a hydraulic circuit. To secure stem 117 in conduit 114 ferrule 118 is concentrically affixed about the conduit, typically by crimping, rolling, swaging, or other compression methods. Ferrule 118 may comprise carbon steel, stainless steel, Monel, cast iron, titanium, nano materials, aluminum, brass, and other machinable alloys as well as certain plastics such as resin polymer material. The contrast of the tough material of the ferrule 118 with the sometimes flexibility of a fluid conduit 114 such as a hose cause a weak point in the conduit at a location at or near end 119 of ferrule 118. As such, it is important to avoid additional stresses along conduit 114 at these locations. Therefore, although collar 102 can be positioned at any location along conduit 114, preferably collar 102 would be disposed at a location along ferrule 118. Referring back to FIG. 1, it would be preferable to terminate sleeve 108 at or near nut 113, to ensure that the entire length of fluid conduit 114 is enclosed.

It should be understood by one of ordinary skill that collar 102 may be affixed to conduit 114 and protective sleeve 108 after the sleeve has been placed around the conduit. Conversely, collar 102 may be partially compressed with raised portions 104 already formed before placing the collar 102 onto the sleeve. The collar could then be tightened over the sleeve once it has been properly positioned over ferrule 118.

Turning again to FIG. 1, the collar 102 may comprise any material, including metal or metal alloy such as aluminum, or steel, brass, copper, polymer, composite, brass, or any other material that can securely retain the sleeve 108 to the ferrule 118. The collar 102 may comprise raised portions 104 which may help define channel 112 by providing an end of channel 112. The seams 110 of sleeve 108 may provide a natural location for channel 112. However, it should be understood that by virtue of providing a raised portion 104, the collar 102 preferably creates a low-pressure fluid escape path or channel 112 no matter its circumferential location around the sleeve 108. Collar 102 may be affixed to the ferrule 118, with sleeve 108 therebetween, by any method that will create a secure fitting between the collar 102, sleeve 108, and ferrule 118. For example, collar 102 can be attached to ferrule 118 by crimping, swaging, rolling, or other compression methods, or by using hand tools. Another method of creating or attaching a collar could be injection molding of the collar around the ferrule and forming the channel ends discussed below through this molding. As a further alternative, the collar may be secured by over-molding a metal, plastic, or other type of collar. Because the diameter of ferrule 118 determines the inside diameter of the collar 102, it is preferable to provide a compression tool sized correctly for the particular size of conduit 114. Any method can be used to attach collar 102 to ferrule 118 depending upon the availability of tooling as well as the intended function of the present embodiment and intended dimension and shape of collar 102. Raised portions 104 are shown as relatively pronounced. However, raised portions 104 may be less pronounced and still provide the desired channel end. Further, only two raised portions 104 are shown. However, any number could be formed.

A goal of the pressure relief assembly 100, which is the safety and well-being of persons standing nearby and/or operating or maintaining the hydraulic system, commonly known as line of sight protection, is achieved by providing a secure means of attachment of the sleeve to the conduit, penetration resistance by sleeve 108, and preferably a pressure relief path for escaping fluid. As such, other embodiments of collar 102 can be contemplated. For example, collar 102 may comprise pinch or ear clamps, or any other type of clamp. Conversely, collar 102 may comprise a very wide collar or band, having various thicknesses, shape and/or size of raised portions 104, and composition. An advantage of using a formable collar 102 is that it is a standalone, continuous, effective component that requires no additional fasteners such as screws, ties, or other fasteners, making use of the collar 102 simple, easy, efficient, and cost-effective, which may be crimped using a number of different methods and/or mechanisms.

FIG. 2 shows an embodiment of uncompressed collar 102' before compression for attachment to sleeve 108 and ferrule 118. Referring to FIG. 2, uncompressed collar 102' has a smooth inner surface 124 and a smooth outer surface 122. Again, uncompressed collar 102' may comprise any type of material, including any formable or workable material such as metals, certain composites, some ceramics, glassy-metallics, shock and impact absorbing materials, noise or vibration reducing materials, high-strength polymers, or any other type of material capable of providing secure attachment of sleeve 108 to collar 118. In certain embodiments the collar might have ridges or shallow teeth defined on inner surface 124. When the uncompressed collar 102' is compressed around ferrule 118, preferably the material of the collar 102' will flow along a path of least resistance and may flow in a uniform manner resulting in a more-or less homogenous collar 102 having raised portions 104. This may be accomplished in accordance with the present invention by only partially compressing uncompressed collar 102', as described in greater detail below.

As shown in FIG. 3, uncompressed collar 102' is formed by compression methods into collar 102 having raised portions 104. FIG. 3 illustrates the compressed shape of collar 102. In embodiments of the present invention, a crimping or swaging tool having retractable dies can be used to compress the collar onto the conduit 114. Such a crimping or swaging tool might have any number of dies. Many such crimping or swaging tools have six or eight dies. To create raised portions 104, one or more dies may be retracted to a desired distance that may be directly proportional to the resultant height of the raised portion 104 (embodied by side 130 of raised portion 104 in the illustrated embodiment). The illustrated embodiment may be created by retracting two dies. Outer surface 134 of raised portion 104 comprises a smooth, relatively even surface illustrating even distribution of the material of compressed collar 102. In embodiments of the present invention, uncompressed collar 102' is compressed in a compressed location 106 and not compressed in raised portion 104 by virtue of retracting two dies in a crimping tool, resulting in raised portions 104. An advantage of the present embodiment is that by compressing the collar 102 directly onto the sleeve 108 and ferrule 118, the task of both firmly attaching the sleeve 108 to the conduit 114, and providing channel 112 for escaping fluid to flow, is completed in one step. In typical compression or crimping of ferrule about a stem, all of the dies are used to create a uniform compression of a ferrule, resulting in elongation of the ferrule along the longitudinal dimensions of the body (conduit) that it surrounds. Thusly, upon compression of the collar 102 with a compression mechanism which may comprise retractable portions or dies, the collar 102 may not elongate, because its material traverses the surface of the retracted die. However, elongation still may occur in addition to the creation of the raised portion 104. Preferably, the material properties of collar 102' are retained or enhanced upon formation of collar 102 through compression methods.

Referring to FIGS. 3 and 4, raised portion 104 comprises a top portion 128, whose shape is defined by the surface of the retracted die or forming portion of the compression tool, which may have an arched shape, and indention 126 also created by the compression tool (not shown). In embodiments of the present invention, the resulting indention 126 is an acute angle between compressed portion 106 and the side 130 of raised portion 104. This angle could be any angle or shape including obtuse angles or other shapes and need not be symmetrical (or tidy). Thus, a raised portion created by hand, with a hand tool, would suffice in accordance in accordance with the present invention. As shown in FIG. 4, raised portion 104 has a smooth inner surface 132 and outer surface 134 and has maintained a uniform thickness that is equal to the thickness of the remaining crimped portion 106 of the collar 102 indicating uniformity (homogeneity) and therefore strength of the collar 102.

Since typical crimping machines comprise tapered dies that accommodate the concentric surface of a ferrule, longitudinal lines or ridges may form on the crimped ferrule after crimping as a result of material flow into the spaces between the dies at their tapered end. When compressing a formable or workable metal such as aluminum, however, ridges may not occur since the amount of force required to compress the collar 102 to the ferrule 118 is less than that required to compress a steel ferrule 118 to a conduit 114 for example. A significant advantage of the collar 102 of the present embodiment is that it can be retrofitted in the field because extreme pressure for compression is not needed. When using collars 102 of a relatively soft material, hand tools may be employed, allowing pressure relief assembly 100 to be assembled in a retrofit fashion very quickly, and in the field.

In summary, many industries can take advantage of the embodiments of the present safety and indicator apparatus systems and methods for high pressure conduits. The pressure relief assembly 100 comprises a channel that is created by a method of attaching a collar 102 to a protective sleeve 108. The pressure relief assembly 100 can be applied to any high pressure conduit 104 in a retrofit manner or during production. The resultant protection and warning system is effective for conduits carrying even very high pressure fluids. The warning system preferably prevents injury to the operator and/or damage to the associated equipment, as the operator, upon seeing a trickling stream of fluid coming out of channel 112, could simply turn off the system. The collar 102 is a standalone product, requiring no fasteners such as those used in pinch clamps. The size, shape, number, and cross section of the raised portion of the collar 102 can be varied depending upon the intended use of the present embodiment as can the desired unit cost. The raised portion 104 and the uncompressed collar 102' can embody virtually any cross section, including square, elliptical, oblong, or oval-shaped cross sections and can vary in size, shape, diameter, weight, thickness, width, or height. For example, one might envision a narrower initial collar 102' or a shorter raised portion 104. The diameter of the uncompressed collar 102' can vary depending upon the size of the conduit 114 and/or its overlaying sleeve 108. The material of the collar 102 would preferably comprise flow properties that would allow it to conform to the shape of the compression tool and retain strong molecular structure, although many materials may be contemplated in the construction of both the sleeve 108 and the collar 102.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A safety and indicator apparatus for fluid conduits comprising:
an impervious sleeve disposed about a conduit;
an interstitial space defined between said sleeve and said conduit; and
a collar disposed on at least one end of said sleeve to secure said sleeve to said conduit and to define at least one end of a fluid channel defined by said interstitial space,
wherein said collar is generally configured to allow fluid to exit said interstitial space through said at least one end of said fluid channel;
wherein said collar is disposed over a coupling at an end of said fluid conduit, securing said at least one end of said sleeve between said collar and said coupling; and
wherein said collar is disposed over a ferrule that secures said coupling to said end of said fluid conduit, and said at least one end of said sleeve is secured between said collar and said ferrule.

2. The safety and indicator apparatus of claim 1, wherein said fluid channel defined by said interstitial space and said channel end provides a path for fluid in said interstitial space to flow out of said interstitial space through said at least one channel end.

3. The safety and indicator apparatus of claim 1, wherein fluid flowing out of said interstitial space at said at least one channel end provides an indication of a failure of said conduit.

4. The safety and indicator apparatus of claim 1, wherein said collar is compressed to secure said sleeve to said conduit and to provide said at least one channel end.

5. The safety and indicator apparatus of claim 4, wherein said collar is compressed by crimping or swaging.

6. The safety and indicator apparatus of claim 5, wherein a crimp or swaging die is retracted prior to crimping or swaging to form a raised portion of said collar which provides said at least one of said channel ends.

7. The safety and indicator apparatus of claim 1, wherein each of two collars is disposed over a coupling at each of the distal ends of said fluid conduit, securing said distal ends of said sleeve between a respective collar and coupling.

8. The safety and indicator apparatus of claim 7, wherein each of the collars is disposed over a crimped ferrule that secures said coupling with said distal ends of said fluid conduit and said distal ends of said sleeve are secured between said respective collar and ferrule.

9. The safety and indicator apparatus of claim 8, wherein each of said collars is compressed to secure said end of said sleeve between said collar and said ferrule and to define an opening at each said end of said fluid channel defined by said interstitial space, said opening providing a path between said sleeve and said ferrule for fluid in said interstitial space to flow out of said interstitial space.

10. The safety and indicator apparatus of claim 1, wherein said conduit is a high pressure fluid conduit and said sleeve is impervious to a stream of high pressure fluid resulting from a pinhole puncture of said conduit.

11. The safety and indicator apparatus of claim 1, wherein said sleeve is impervious to streams of high pressure fluid resulting from a pinhole puncture of said conduit at a pressure above a rated pressure of said conduit.

12. The safety and indicator apparatus of claim 1, wherein said conduit is a high pressure fluid conduit and said sleeve is impervious to bursts of said conduit at a pressure above a rated pressure of said conduit.

13. The safety and indicator apparatus of claim 1, wherein said sleeve is impervious to bursts of said conduit occurring at a pressure twice the rated pressure of the conduit.

14. A method comprising:
disposing an impervious sleeve over a fluid conduit, establishing an interstitial space between said sleeve and said fluid conduit;
securing distal ends of said sleeve to distal ends of said fluid conduit; and
defining channel ends at said distal ends of said fluid conduit to allow fluid in said interstitial space to flow out of said interstitial space through at least one of said channel ends, providing an indication of a failure of said conduit;
wherein said securing comprises disposing a collar over a ferrule that secures a coupling with said distal ends of said fluid conduit and securing said distal ends of said sleeve between a respective collar and ferrule.

15. The method of claim 14, wherein said securing comprises crimping said collar to form a raised portion of said collar which provides an opening at said at least one channel end for said fluid to flow out of said interstitial space.

16. The method of claim 14, wherein said securing comprises crimping said collar to form a raised portion of each said collar which provides an opening at each of said channel ends for said fluid to flow out of said interstitial space.

17. The method of claim 14, wherein said securing comprises disposing a collar over each of said distal ends of said conduit and compressing said collar to secure said sleeve to said conduit.

18. The method of claim 17, wherein said defining comprises compressing said collar to define said channel ends.

19. The method of claim 18, wherein said compressing comprises crimping or swaging.

20. The method of claim 19, wherein said crimping comprises retracting a crimp or swaging die prior to crimping to form a raised portion of said collar which provides an opening at said at least one of said channel ends during said crimping for said fluid to flow out from said interstitial space.

21. The method of claim 14, wherein said conduit is a high pressure fluid conduit and said sleeve is impervious to streams of high pressure fluid resulting from pinhole punctures of said conduit.

22. The method of claim 14, wherein said sleeve is impervious to streams of high pressure fluid resulting from a pinhole puncture of said conduit at a pressure above a rated pressure of said conduit.

23. The method of claim 14, wherein said conduit is a high pressure fluid conduit and said sleeve is impervious to bursts of said conduit at a pressure above a rated pressure of said conduit.

24. The method of claim 14, wherein said sleeve is impervious to bursts of said conduit occurring at a pressure twice a rated pressure of said conduit.

25. A hose system comprising:
a high pressure hose;
an impervious sleeve disposed over said hose, defining an interstitial space between said sleeve and said hose, said impervious sleeve being impervious to streams of high pressure fluid resulting from a pinhole puncture of said hose and burst of said hose at a pressure above a rated pressure of said hose;
a coupling disposed in each end of said hose; and
a collar disposed on at least one end of said sleeve, compressed to secure said end of said sleeve between said collar and a ferrule securing said coupling in said end of said hose and to define an opening at the end of a fluid channel defined by said interstitial space, said opening providing a path for fluid in said interstitial space to flow out of said interstitial space at said at least one end of said sleeve and to provide an indication of a failure of said hose.

* * * * *